United States Patent
Smithson et al.

(10) Patent No.: US 6,802,470 B2
(45) Date of Patent: Oct. 12, 2004

(54) SEAT BELT RETRACTOR

(75) Inventors: Alan George Smithson, Wetheral (GB); David Blackadder, Corby Hill (GB); Paul Bowman, Little Corby (GB); David Charles Winter, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 74 days.

(21) Appl. No.: 10/186,642

(22) Filed: Jul. 2, 2002

(65) Prior Publication Data

US 2003/0052210 A1 Mar. 20, 2003

(30) Foreign Application Priority Data

Sep. 19, 2001 (GB) .............................................. 0122596

(51) Int. Cl.$^7$ .............................................. B60R 22/38
(52) U.S. Cl. ................. 242/383; 242/383.4; 242/384.5; 242/384.6
(58) Field of Search .............................. 242/383, 383.4, 242/384.5–384.6; 280/806; 297/478

(56) References Cited

U.S. PATENT DOCUMENTS

| | | | | |
|---|---|---|---|---|
| 4,564,154 A | * | 1/1986 | Takada .................... | 242/383.4 |
| 4,726,541 A | * | 2/1988 | Tsukamoto et al. ....... | 242/383.1 |
| 5,332,291 A | * | 7/1994 | Fujimura et al. ........... | 297/480 |
| 5,485,971 A | * | 1/1996 | Nakaya et al. ............ | 242/381.1 |
| 5,593,105 A | * | 1/1997 | Schmid et al. ........... | 242/383.4 |
| 6,283,398 B1 | * | 9/2001 | Specht .................... | 242/383.4 |

* cited by examiner

Primary Examiner—Kathy Matecki
Assistant Examiner—Sang Kim
(74) Attorney, Agent, or Firm—L. Drayer; J. Rieger

(57) ABSTRACT

A seat belt retractor for a vehicle safety restraint has a spool rotatably mounted in a frame. A ratchet wheel is rotatably mounted to rotate with the spool. A control member is mounted in the frame. A locking pawl is pivotally mounted in the frame to pivot into engagement with the ratchet wheel. A sensor is responsive to the spool. Upon activation of the sensor, a cam surface and a cam follower couple the locking pawl to the control member. The cam surface has a discontinuity arranged so that the cam follower loses contact with the cam at high speeds but stays in contact with the cam surface at low speeds. Preferably, the discontinuity is a raised portion providing a first ramp in one direction in one portion on one side of the discontinuity of the cam surface and a second ramp in a different direction in a second portion of the cam surface on the other side of the discontinuity.

4 Claims, 4 Drawing Sheets

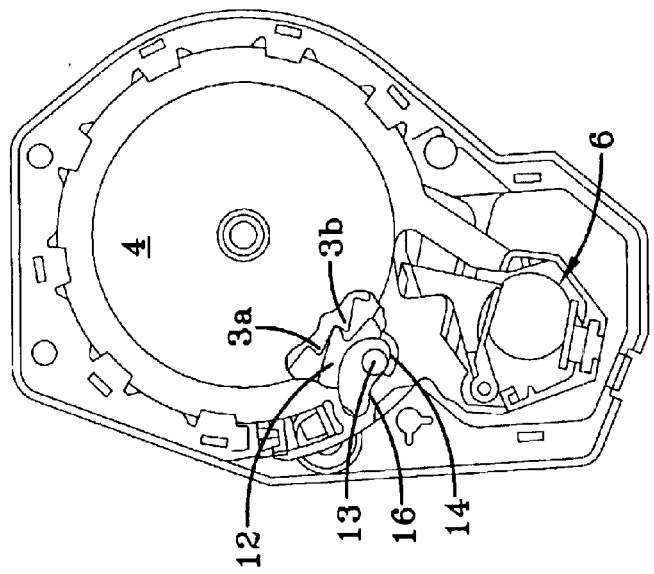
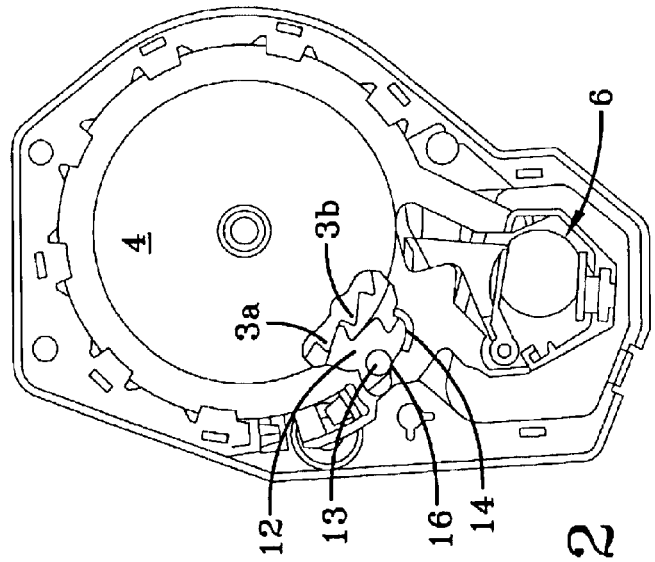
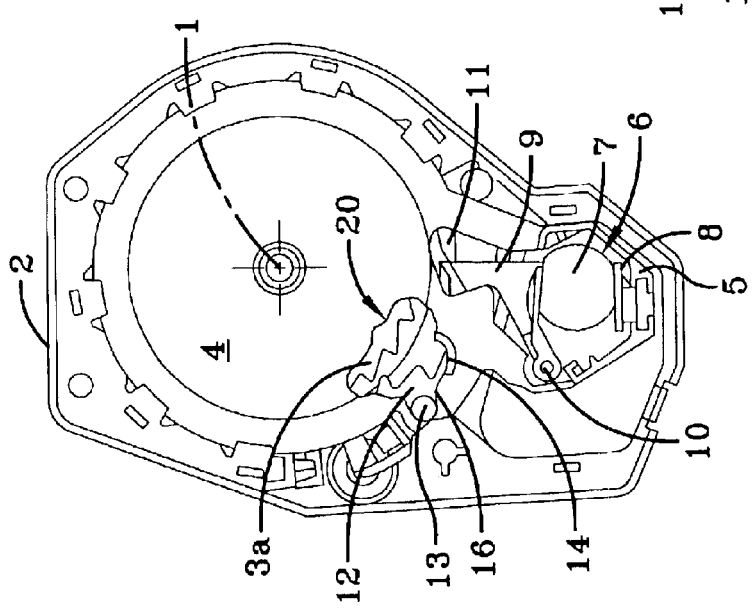

SEAT BELT RETRACTOR

FIELD OF THE INVENTION

The present invention relates to a retractor for a vehicle seat belt.

BACKGROUND OF THE INVENTION

A seat belt retractor typically has a spool onto which seat belt webbing is wound. The spool is mounted in a frame for rotation about the axis of rotation of the spool and is spring loaded in a direction to wind up the webbing to keep the webbing taut across a vehicle occupant. Modern seat belt retractors apply a gentle restraining force to the vehicle occupant but allow some movement for the comfort of the vehicle occupant. For example, allowing the vehicle occupant to lean forward to retrieve items from a glove compartment or to tune a radio.

At least one crash sensors is incorporated into the seat belt retractor to detect an emergency situation. When the crash sensor detects and emergency situation a mechanism is activated to lock the spool against rotation in a webbing protraction direction, thus securely restraining the vehicle occupant against forward motion.

The mechanism which effects this locking typically comprises a load bearing locking pawl pivotally mounted in the frame to engage a toothed ratchet wheel attached to the spool. The locking pawl is rotated into engagement with the ratchet wheel by interaction of a cam follower on the pawl with a cam slot in a control member. When an emergency is detected, the crash sensor causes the control member to be coupled to the spool so that the control member rotates. Thus, the cam moves and the cam follower slides along the cam surface causing the locking pawl to pivot into engagement with the ratchet wheel and lock the spool. The vehicle occupant is then securely restrained.

The cam is traditionally a smooth, gently curved surface along one side of an oval or curve shaped cut-out in the control member so that the locking pawl is brought into engagement in a smooth controlled manner. The geometry is arranged so that the engagement is correctly phased. For example, so that the pawl cleanly engages between teeth of the ratchet, because if it is brought into engagement tooth to tooth, at the high speed and high force typical of modern seat belt retractor, the teeth will not lock properly and are likely to shear.

A problem has recently been identified in modern seat belt retractors. Ever increasing speeds of operation are demanded by manufacturers to satisfy the ever more stringent safety requirements of the regulatory bodies. Modern seat belt retractors are used with pretensioners that actively retract a predetermined amount of webbing back onto the spool to take up slack in the webbing and more securely restrain the vehicle occupant before locking the retractor, or which cause the buckle of the restraint system to move down rapidly thus taking up any slack. Modern pretensioners use pyrotechnic firing mechanisms and are very fast. However, at high speeds of operation, the retractor components are subject to high dynamic loading due to the mass properties of the components and the forces necessary to accelerate them. This results in deformation of the components and causes a change in their kinematic response. As a result, the locking pawl tends to be engaged later as the speed of operation increases. In the extreme, the locking pawl will be out of phase with the ratchet wheel and will not lock properly or will cause components to shear, thus destroying the retractor. This is undesirable.

To overcome this problem, the phasing of the locking pawl engagement can be adjusted to be correct at high-speed operation. However, the seat belt retractor then fails to lock properly at low speed operation, which results in excess wear on the components at low speed and consequently early failure of the mechanism or jamming of the retractor.

SUMMARY OF THE INVENTION

The present invention provides an improved seat belt retractor that can operate effectively and reliably over a wide range of speed.

According to the present invention, there is provided a seat belt retractor comprising a spool rotatably mounted in a frame, a ratchet wheel rotatably mounted to rotate with the spool, a control member mounted in the frame, a locking pawl pivotally mounted in the frame to pivot into engagement with the ratchet wheel, a sensor responsive to an emergency, a mechanism for coupling the control member to the spool upon activation of the sensor, a cam surface and a cam follower coupling the locking pawl to the control member, wherein, the cam surface has a discontinuity arranged so that at low speeds of operation cam follower stays in contact with the cam surface and follows the cam surface to bring the locking pawl into engagement with the ratchet wheel, and at high speeds of operation the cam follower leaves the cam surface before the locking pawl engages with the ratchet wheel, in the region of the discontinuity because of the impulsive load generated between the cam follower and the cam surface to move the locking pawl into engagement with the ratchet wheel earlier than under low speeds of operation.

BRIEF DESCRIPTION OF THE DRAWINGS

For a better understanding of the present invention and to show how the same may be carried into effect, reference will now be made by way of example, to the accompanying drawings.

FIGS. 1 to 3 are part cut away side views of a seat belt retractor according to the present invention showing a locking sequence at low speed operation.

DETAILED DESCRIPTION OF THE INVENTION

Figure 4:
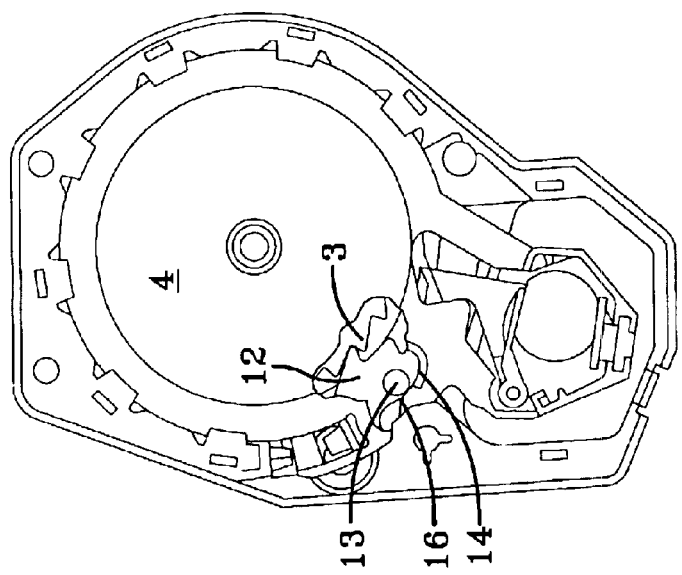
FIGS. 4 to 6 are part cut away side views of a seat belt retractor according to the present invention showing the locking sequence at high speed operation.

In FIGS. 1 to 6, a retractor spool has an axis of rotation 1, rotatably mounted in a frame 2: A ratchet wheel is attached to the spool and has peripheral teeth 3a, 3b (which are visible in the cutout of the figures). A control member 4 commonly known as a lock cup is mounted to be free to pivot coaxially with the axis of rotation 1 of the spool when it is coupled to the spool. The control member 4 has a sensor housing 5 in which a vehicle sensor 6 of known "ball-in-cup" construction is mounted. The vehicle sensor 6 comprises a ball 7 loosely mounted in a cup 8 with a concave top surface. In the event of an emergency, the vehicle will accelerate or decelerate at a rate above a predetermined threshold. The inertia of the ball 7 will cause it to be displaced in the cup 8 relative to the sensor housing 5 and to ride up the sides of the cup 8. A sensor pawl 9, rests on the ball 7 and is pivoted about a pivot point 10 in the housing is displaced upwardly to engage teeth 11 on the spool. This couples the spool to control member 4. The control member 4 pivots (clockwise in the figures) due to the continued force on the seat belt webbing.

A locking pawl with several locking teeth is shown in the cut-away portion 20 of the figures. The locking pawl has a pin 13 extending toward the viewer of the figures that acts as a cam follower to cooperate with a cam surface 14 on the lower edge of a hole 15 (see FIG. 4) in the control member 4. The hole 15 is extended by the cut-away portion 20 in FIGS. 1 to 3 and 5 and 6 but the shape of the lower surface 14 and the shape of the whole hole is clearly seen in FIG. 4. Alternative shapes of the hole 14 are shown in more detail in FIGS. 7 to 13. The cam surface 14 in FIGS. 1 to 6 has a shape in the form of a humped back bridge. For example, the surface does not change smoothly, but has a relative discontinuity in the form of a raised portion 16. The portion of the surface 14 to the left of the peak of the raised portion 16 provides a ramp generally angled upward toward the spool and is preferably generally concave in profile.

Preferably, the discontinuity comprises a raised portion 16 between a first ramp extending generally in a first direction on one side of the discontinuity of the cam surface and a second ramp extending generally in a different direction on the other side of the discontinuity.

Thus, the cam surface provides a first ramp in one direction on one side of the discontinuity 16 and a second ramp in a different direction on the other side of the discontinuity.

According to a preferred embodiment, the first ramp is concave. The second ramp may be convex. The cam surface may be provided on the lower or on the upper edge of a cut out or hole in the control member and may take any of a variety of specific shapes.

Under low speed operation, as shown in FIGS. 1 to 3, the pin 13 acting as cam follower stays in contact with the surface 14, riding over the raised portion 16 and following the surface 14 to bring the locking pawl 12 into engagement with the ratchet wheel teeth in phase.

Specifically, in FIG. 1, the seat belt retractor is shown at rest. The teeth of the locking pawl 12 are clear of the ratchet wheel teeth 3 and the spool is free to rotate about the axis of rotation 1 of the spool. However, an emergency has just been detected by the sensor 6 and the sensor ball 7 has moved to the right, riding up the side of the concave cup 8 and lifting the sensor pawl 9 upwards. The sensor pawl 9 is beginning to engage with the spool teeth 11.

In FIG. 2, a short time later, the sensor pawl 9 has engaged the spool teeth 11 and couples the control member 4 to the spool. Further reaction force on the webbing therefore causes the control member 4 to pivot clockwise and the pin 13 on locking pawl 12 moves over the cam surface 14. In FIG. 2, the pin 13 has reached the raised portion 16 but is still in contact with the surface 14 because the operation is at slow speed. The movement of the pin 13 across the surface 14 pivots the locking pawl 12 counter-clockwise and brings the leading locking tooth of the locking pawl 12 into abutment with the trailing edge of a tooth 3a on the ratchet wheel. The spool is not yet fully locked.

In FIG. 3, the control member 4 has turned further clockwise and the pin 13 has passed the raised portion 16 of the surface 14 but is still in contact. At this stage the locking tooth of pawl 12 is fully engaged between the teeth 3a and 3b on the ratchet wheel and the spool is locked.

Figure 5:
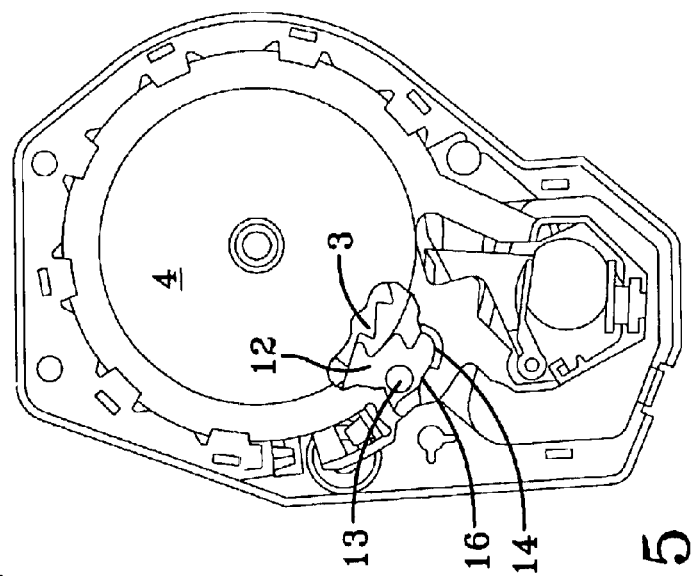
Figure 6:
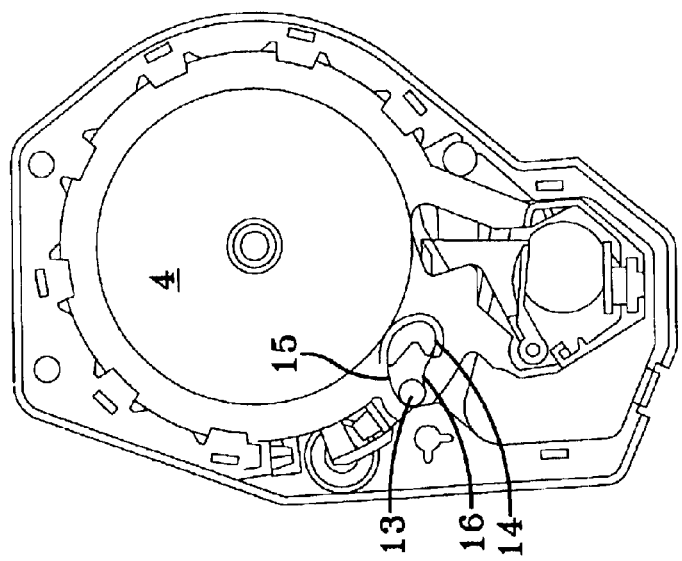

At high speed operation, as shown in FIGS. 4 to 6, the pin 13 leaves the surface 14 in the region of the raised portion 16 and brings the locking pawl 12 into engagement with the ratchet wheel slightly earlier than under low speed operation. This serves to compensate for deformation of components under the higher stresses involved in high-speed operation of the seat belt retractor.

The operation at high speed is similar to that at low speed described in relation to FIGS. 1 to 3 but the pin 13 leaves the surface 14 in the region of the raised portion 16 because of the intentional impulsive load generated between the pin 13 and the surface 14. The pin 13 is therefore no longer forcibly driven by the surface 14.

The pin 13 only leaves the surface 14 by a very small amount, for an example, between a fraction of a millimeter and a couple of millimeters. The clearance may be barely visible to the naked eye but provides just sufficient advantage to the speed of engagement of the locking pawl as to ensure correct phasing of the locking operation at high speeds. The raised portion 16 could be replaced by any discontinuity or sudden change in the profile or curvature.

Once the teeth on the locking pawl 12 begin to engage the teeth on the ratchet wheel, the locking pawl 12 is pivoted further by the motion of the spool itself, and, no reaction between the pin 13 and the surface 14 is necessary.

A seat belt retractor constructed according to the present invention generally avoids jamming and breakage during simulated lifetime testing but is safe to use with high-speed pyrotechnic pretensioners.

Figure 7:
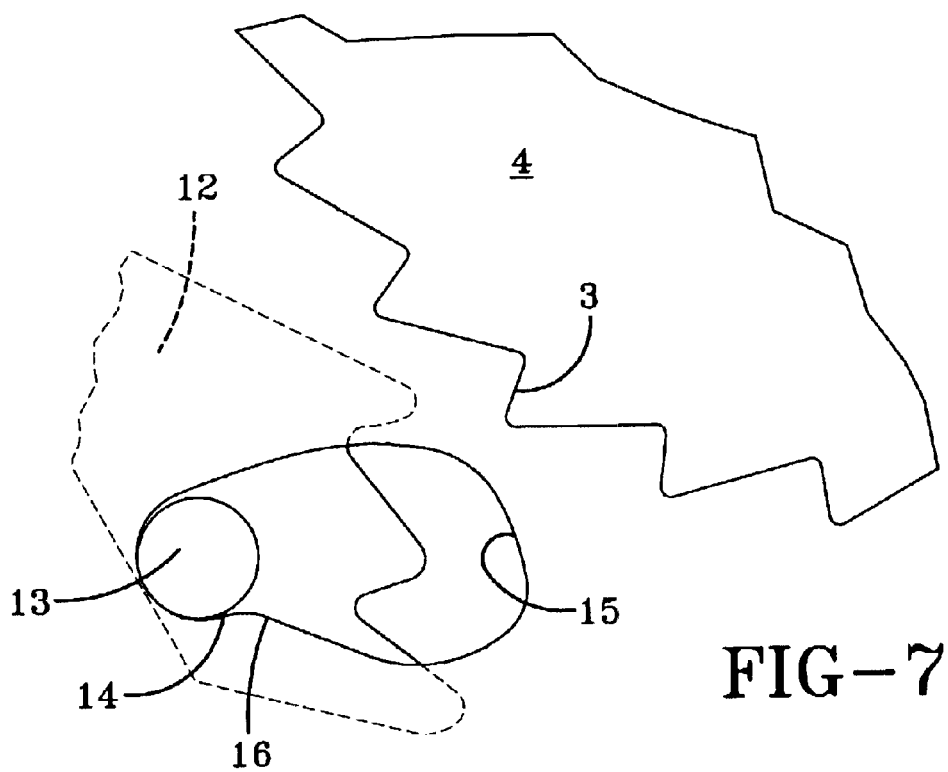
FIGS. 7 and 8 are enlarged views of part of the seat belt retractor of the present invention showing two alternative embodiments.
Figure 8:
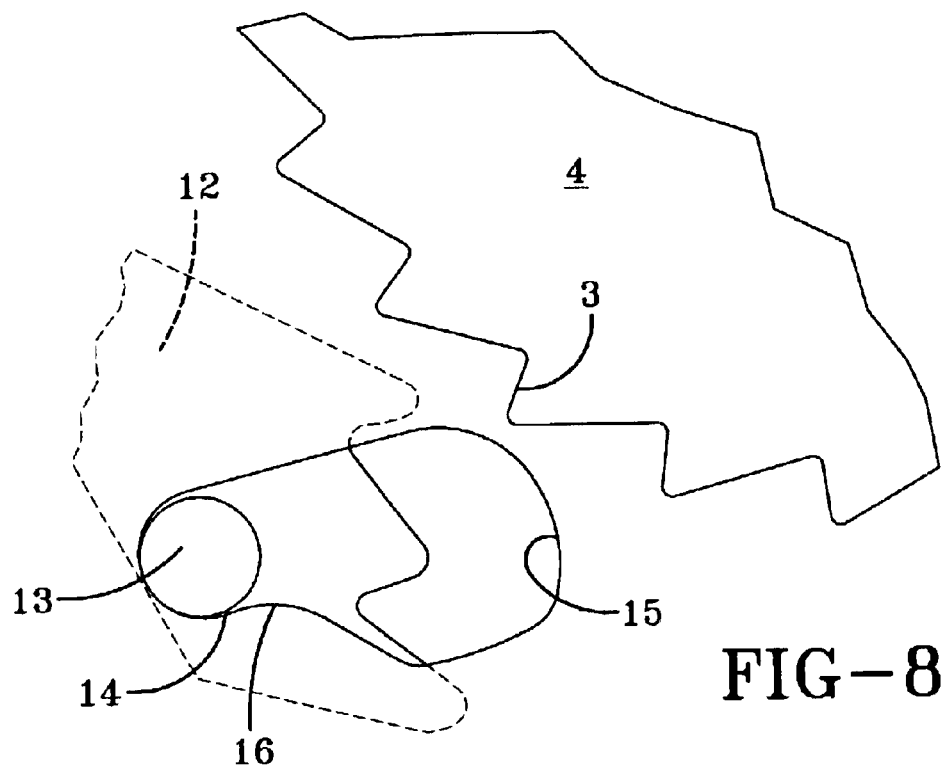

FIGS. 7 and 8 are enlarged views illustrating two specific shapes for the hole 15 and specifically for the cam surface 14 and discontinuity 16.

Figure 9:
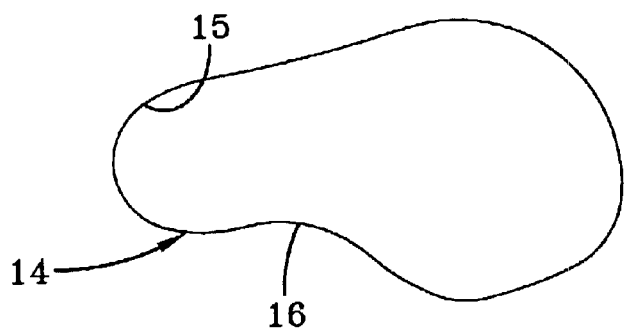
FIGS. 9 to 13 show five different embodiments of holes providing cam surfaces that may be employed in a seat belt retractor of the present invention.
Figure 10:
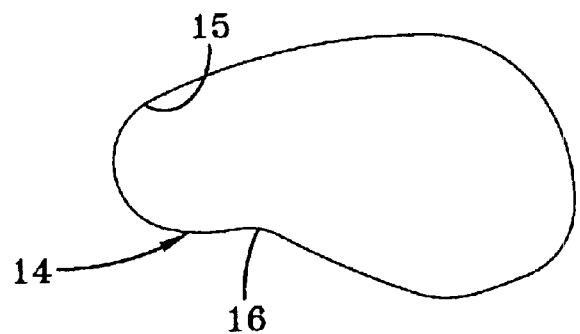
Figure 11:
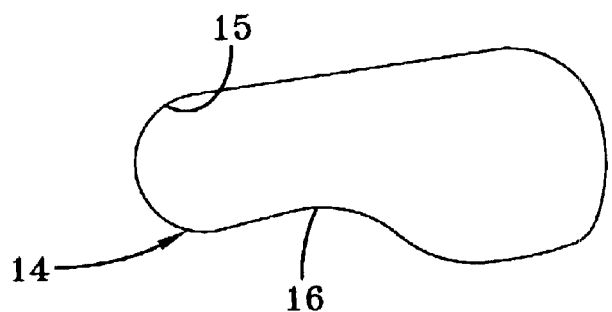
Figure 12:
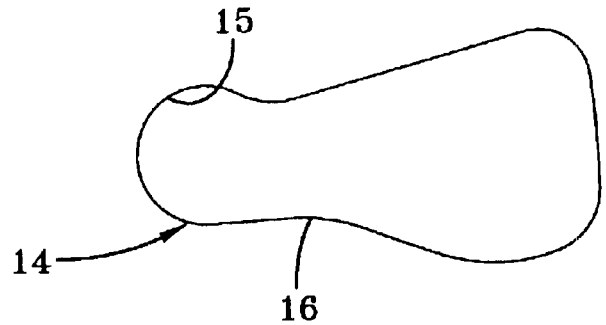
Figure 13:
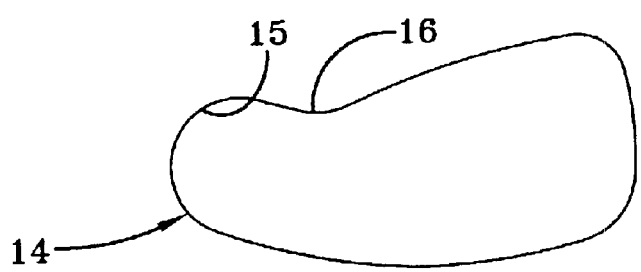

FIGS. 9 to 13 show five different alternative shapes for the hole 15. In FIG. 9, the discontinuity 16 is relatively shallow, in FIG. 10 it is more abrupt, in FIG. 11, it is relatively long and in FIG. 12 it is even larger. In FIG. 16, the discontinuity is shown on the upper edge of the hole 15. Other variations will be evident to a person skilled in the art and the exact shape of the cam surface 14 will be determined in practice by the efficiency of operation having regard to the particular parameters of the specific seat belt retractor.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

We claim:

1. A seat belt retractor comprising
a spool rotatably mounted in a frame,
a ratchet wheel rotatably mounted to rotate with the spool,
a control member mounted in the frame and having a cam surface, the cam surface is provided on a lower surface of a hole of the control member, the cam surface comprising a discontinuity, a first ramp, and a second ramp, the discontinuity is a raised portion on a lower edge of the cam surface substantially facing a center of the control member, the first ramp is formed on one side of the discontinuity and the second ramp is formed on an other side of the discontinuity,
a locking pawl pivotally mounted in the frame to pivot into engagement with the ratchet wheel, a sensor responsive to an emergency, a mechanism for coupling the control member to the spool upon activation of the sensor, and a cam follower coupling the locking pawl to the control member, whereby at low speeds of operation the cam follower stays in contact with the cam surface and follows the cam surface to bring the locking pawl into engagement with the ratchet wheel, and at high speeds of operation the cam follower leaves the cam surface before the locking pawl engages with the ratchet wheel, in the region of the discontinuity because of the impulsive load generated between the cam follower and the cam surface to move the locking pawl into engagement with the ratchet wheel earlier than under low speeds of operation.

2. The seat belt retractor according to claim 1 wherein the first ramp is concave.

3. The seat belt refractor according to claim 2 wherein the second ramp is convex.

4. The seat belt refractor according to claim 1 wherein the second ramp is convex.

\* \* \* \* \*